May 30, 1967 W. H. ORTH 3,322,413
FURNACES FOR FAST-FIRING CERAMIC WARE, AND
FAST-FIRING PROCESS

Filed Oct. 1, 1965 3 Sheets-Sheet 1

WILLIAM H. ORTH
*INVENTOR.*

BY *G. G. Christensen*

ATTORNEY

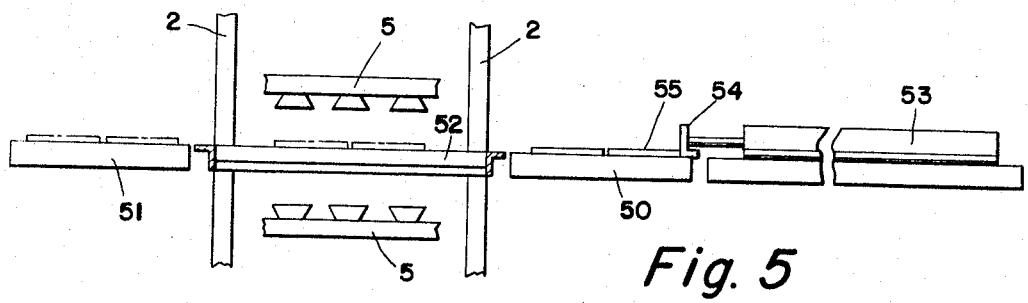
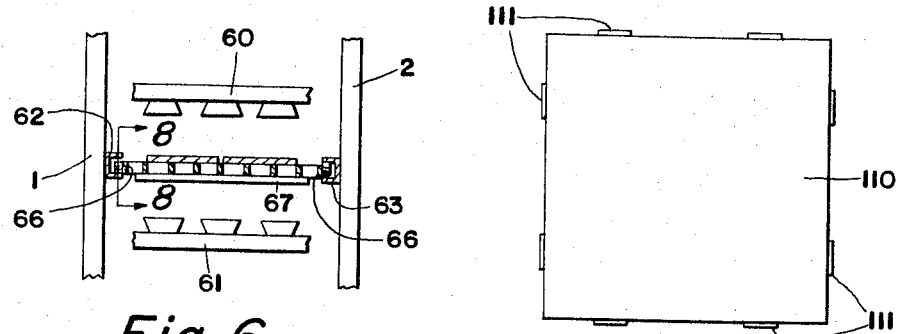
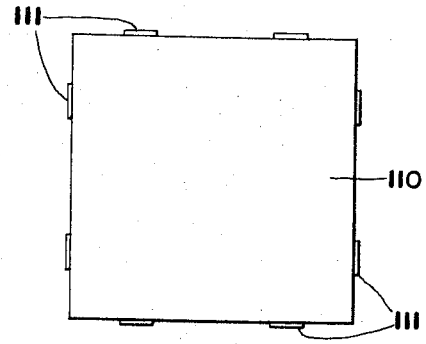
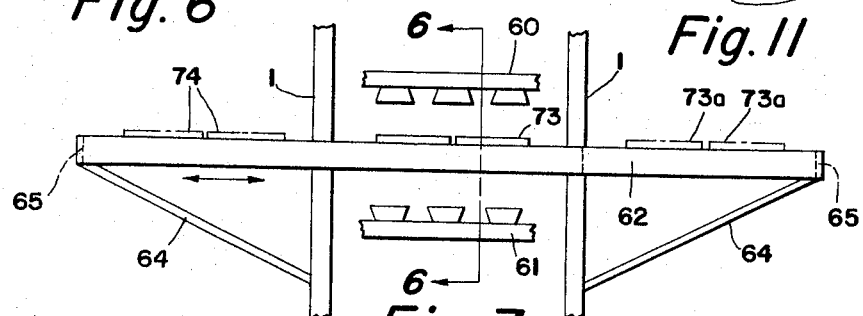
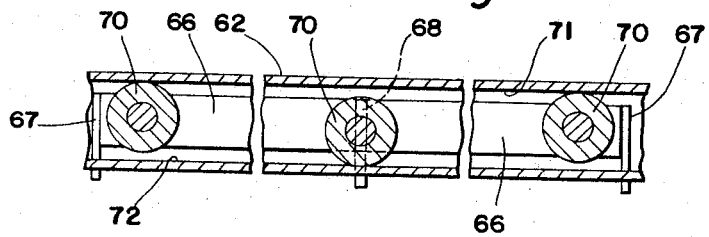
WILLIAM H. ORTH
INVENTOR.
BY G. G. Christensen
ATTORNEY May 30, 1967  W. H. ORTH  3,322,413
FURNACES FOR FAST-FIRING CERAMIC WARE, AND
FAST-FIRING PROCESS Filed Oct. 1, 1965  3 Sheets-Sheet 3

WILLIAM H. ORTH
INVENTOR.

BY G. G. Christensen

ATTORNEY

United States Patent Office 3,322,413
Patented May 30, 1967

3,322,413
FURNACES FOR FAST-FIRING CERAMIC WARE, AND FAST-FIRING PROCESS
William Henry Orth, Baltimore, Md., assignor to The Glidden Company, Cleveland, Ohio, a corporation of Ohio
Filed Oct. 1, 1965, Ser. No. 492,256
13 Claims. (Cl. 263—6)

This invention is a continuation-in-part of copending application Ser. No. 380,419, filed July 4, 1964, now abandoned.

This invention relates to furnace structures and a process for fast-firing ceramic articles, e.g., for firing unfired ware and/or for firing ware which is being glazed, enameled, etc. The furnace can also be used for other purposes.

It has long been customary in the ceramic art to fire ceramic articles in furnaces, kilns, etc. which have been of relatively massive design incorporating heavy walls, floors, and ceiling, usually of heat-resisting refractories. The main purposes of the massive structure were to minimize loss of heat to the surrounding atmosphere and thereby to secure uniform heat in the firing chamber at a minimum of fuel cost. In use, such massive furnaces required long heat-up periods and, once heated, were desirably kept hot and busy. The work (i.e. the ceramic articles to be fired) was introduced and removed from the hot firing chamber in various ways as by manually placing the work on hearths in a chamber and later manually retrieving the work, by assembling the work on track guided cars which could be moved into and out of the firing chamber, etc.

Such massive furnaces are not suited to the principles of fast-firing, which contemplates fast heat-up of the cold work, a short time at firing temperature, and then a short cooling time i.e. a predetermined temperature/time cycle of short duration. While the principles of fast-firing can be approached to some degree by moving the work quickly into a hot chamber, e.g. 1650–2100° F. allowing it to stay therein for a short time and then quickly removing it, the resulting overall time required for such commercial operations seldom is less than 2.5–3 hours because the work necessarily has to be carried into the furnace on some sort of support. The support accordingly has to be heated up and cooled off along with the work. Thus the total mass of material which has to go through the firing cycle is always appreciably greater than the mass of the work itself and hence prolongs the cycle.

The present invention is based on the concept of bringing the heat to the work, rather than as heretofore, bringing the work to the heat. Under this concept, novel furnace structures have been devised and a process involving the use of movable sources of heat so arranged that the work can be placed on a relatively cool hearth having low mass and hence a short heatup time, after which the sources of heat are moved into close proximity to the work. The work is then quickly brought up to firing temperatures and held there for a desired short time, after which the sources of heat are quickly withdrawn, whereby the hearth and work cool down quickly. In furtherance of this objective, the furnaces are also designed so as to be free of heavy masses of refractory which must go through the firing cycle, while the furnace structure is also quite open to the atmosphere and essentially free of walls, floors or ceilings that hold heat. In this way, the work, after being suitably fired according to a desired temperature/time curve, is quickly cooled by open contact with the atmosphere and/or by forced and/or gravity drafts of unheated air. Firing cycles of a few minutes, e.g., 5 to 20, are easily obtained. Such is the meaning herein of the term "fast-fire."

Accordingly, it is an object of this invention to provide a furnace structure designed for fast-firing of ceramic articles.

It is a further object to provide a fast-fire furnace wherein substantially only the work and a hearth of fast heat-up and fast cooling time are exposed to the desired firing heat.

Another object is to provide a fast-firing furnace employing heat sources which can be moved quickly toward and away from the work while the latter is suitably supported by a hearth having a fast heat-up and fast cooling time.

Still another object is to provide a fast-firing furnace in which the surrounding atmosphere has free access to the work, especially during cooling, whereby fast cooling can be achieved after the work and sources of heat have been separated.

Yet another object is to provide a process for fast-firing ceramic articles.

These and relates objects will be understood from the foregoing and following description taken in conjunction with the attached drawings in which:

FIGURE 5 is a diagrammatic side view of a furnace of the invention augmented with means for pushing ceramic ware into and from the hearth of the furnace.

FIGURES 6–8 together illustrate a "shuttle" hearth, use of which facilitates the loading and unloading of a furnace of the invention. FIGURE 6 is a fragmentary end view showing part of the structure of the shuttle hearth, and FIG. 7 is a fragmentary side view showning the tracks which guide and support the shuttle hearth. FIGURE 8 is an enlarged fragmentary sectional view taken on the line 8—8 of FIG. 6.

Figure 9:
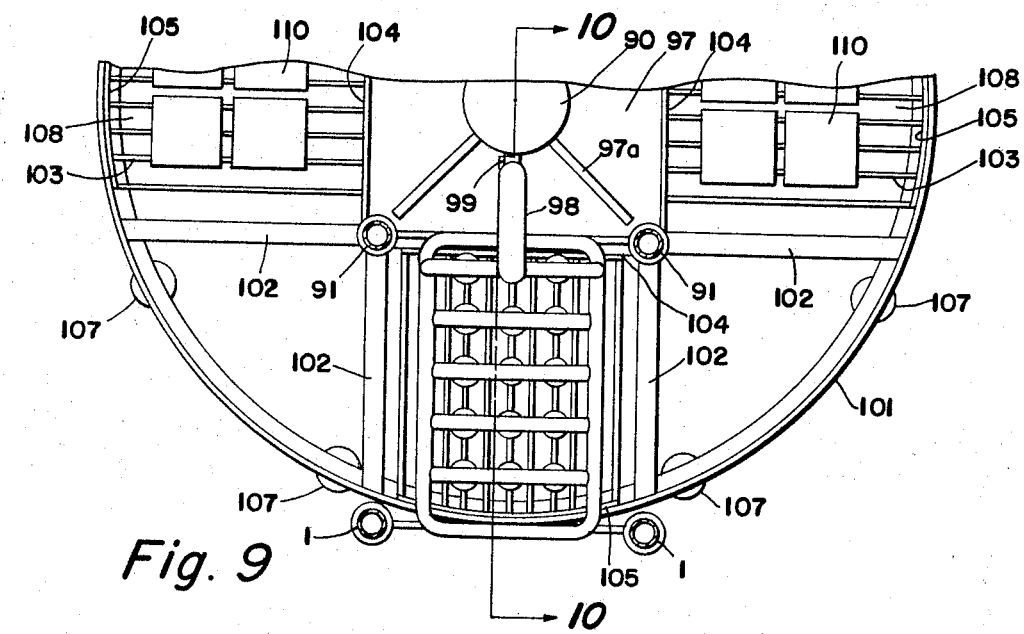
Figure 10:
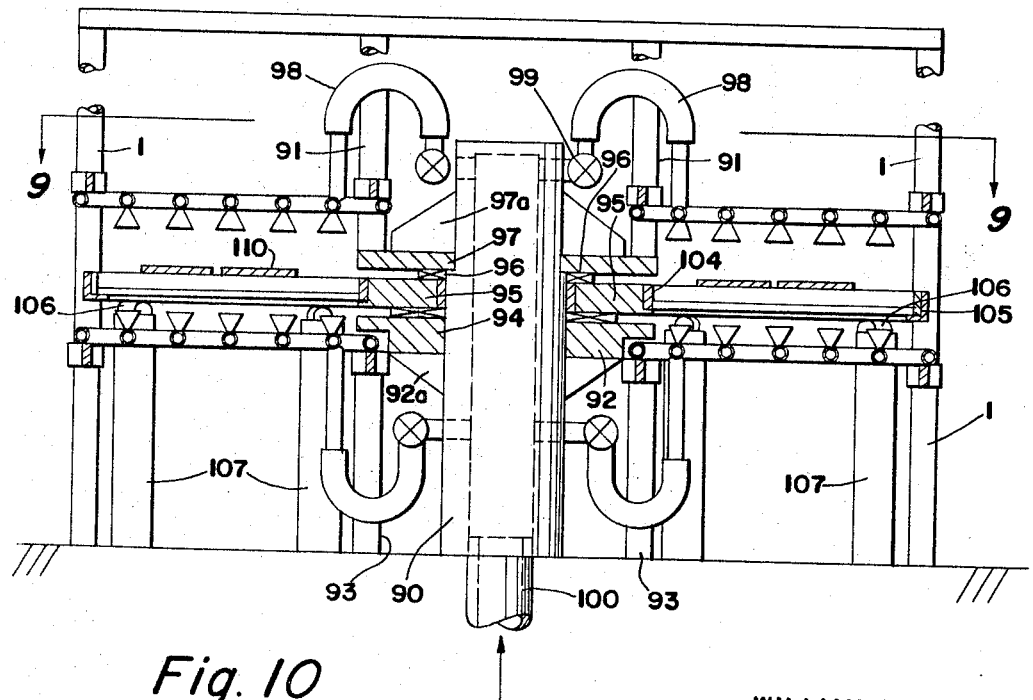

FIGURE 9 is a fragmentary plan view of a circular hearth furnace assembly, the view being taken on line 9—9 of FIG. 10.

FIGURE 10 is a vertical sectional view of the circular hearth assembly taken on line 10—10 of FIG. 9.

FIGURE 11 is a plan view of a standardized wall tile such as would represent a ceramic body which is to be fired in accordance with the present invention.

At the outset, it should be understood that not all ceramic bodies and glazes are amenable to fast-fire treatment, due to expansion qualities, phase-inversion features, etc., which are detrimental to certain compositions when occurring in a fast-heating or cooling time. Those skilled in the art have long recognized this fact and automatically, when thinking in terms of fast fire, exclude such formulations from consideration. It will thus be understood that the present invention is directed to the treatment of any of the many ceramic body compositions and glaze formulations which are physically amenable to the fast-fire technique. A few typical compositions are set forth hereinafter, but they should be recognized as being illustrative rather than limiting.

Figure 1:
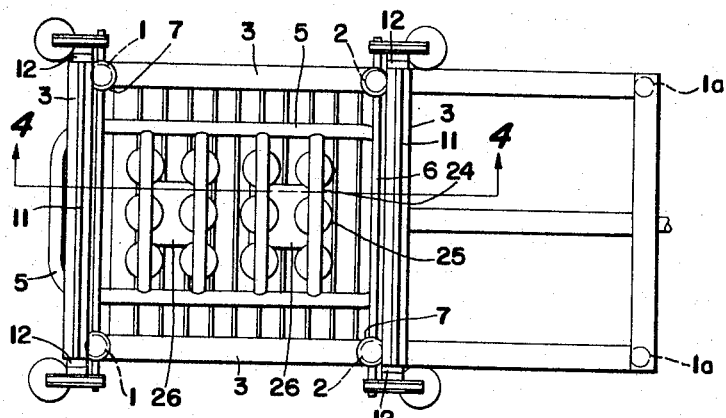
FIGURE 1 is a top view of one furnace structure illustrating the principles of the invention.
Figure 2:
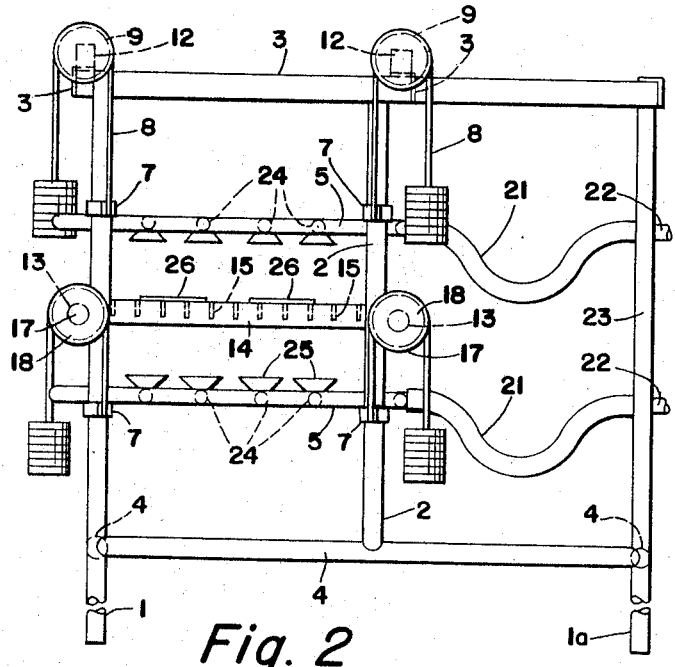
FIGURE 2 is a side elevational view of the structure of FIGURE 1.
Figure 3:
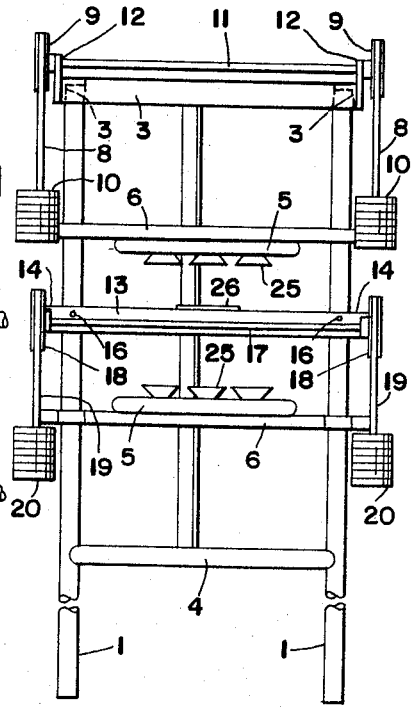
FIGURE 3 is an end view, taken from the left end of FIGURES 1 and 2.

Referring now to FIGURES 1–3, the embodiment shown therein comprises a welded angle and pipe frame having four corner tubes 1, 1, 1a, 1a and two intermediate tubes, 2, 2 joined at their top ends by angles 3, 3 and joined at a convenient lower level by tubes 4, 4. The upright tubes 1, 1 and 2, 2 provide vertical and parallel guiding surfaces within which two burner manifolds 5, 5 are arranged for up and down movement in a vertical direction. The manifolds are secured, as by welding, to guide bars 6, 6 having circular openings 7, 7 near opposite ends to fit around pairs of said four tubes 1, 1 and 2, 2. The upper manifold and its attached guide bars are carried by chains 8, 8 secured, as by welding, to the extremities of the guide bars 6, 6. The chains pass over pulleys 9, 9 and the other ends of the chains terminate in counterbalancing weights 10, 10.

The pulleys 9, 9 at the top of the frame are mounted on and secured to the ends of a pair of shafts 11, 11 which are journalled in brackets 12, 12 secured, as by welding, to the frame.

Between the two burner manifolds 5, 5 is positioned a stationary hearth formed of two end bars 13, 13, a pair of side angles 14, 14 and a plurality of thin ceramic or heat-resistant metallic hearth bars 15, 15 set on edge and extending between said side angles 14, 14. The hearth can be clamped or otherwise secured to said corner tubes 1, 1 and 2, 2 as by pins or set screws 16, 16 extending into said tubes from end bars 13, 13. The end bars also have their ends bent outwardly to provide journals for shafts 17, 17 on the ends of which are secured, as by set screws, pulleys 18, 18. Chains 19, 19 pass over these pulleys, one end of each terminating at an end of guide bars 6, 6 of the lower burner manifold and the other ends terminating in counterweights 20, 20.

Thus it will be evident that the two burner manifolds can be quickly raised or lowered manually in respect to the stationary hearth while being guided in such movement by the four corner tubes 1, 1 and 2, 2.

The manifolds 5, 5 are shown to be composed of metal tubing which is gas-tight and which provides a complete outer circuit for the flow of air/fuel gas mixture introduced thereto by flexible hoses 21, 21 and conduits 22, 22, supported on angle 23. The outer circuit of the manifolds also serves as headers for a plurality of cross tubes 24, 24 which carry a plurality of burner heads 25, 25.

Thus it will be clear that by lighting the air/gas mixture passing out of the burner heads 25, 25, two separate planar sources of uniform heat (above and below the hearth) can be provided. In addition, these sources of heat can be brought close to the hearth quickly or can be moved quickly away therefrom.

In operation, the air/fuel mixture is ignited at the burner heads, 25, 25, and adjusted for maximum heat with a compact flame. Commercial Selas (MT) burner heads are illustrated in the drawings by the conical shape of the ceramic material surrounding the exit ports (not shown), and such burner heads give high heat with a flame which lies almost wholly within the conical ceramic. Attention is drawn to this facet of the burners since the burners should not give a flame which would impinge on the ceramic articles which are to be or are being fired.

Ceramic articles of appropriate formulation, such as wall or floor tile 26, 26, are placed on the hearth at positions where they will be uniformly heated when the manifolds 5, 5 are brought close to the hearth. The manifolds are then moved toward the tiles and brought to rest with the burner heads a few inches away from the tiles. Under such conditions the tiles are heated about equally from opposite sides across their thin dimension and hence are heated quickly and uniformly to the desired firing temperature(s). When the desired firing time has elapsed, the manifolds are then quickly moved away from the hearth. The hot fired tiles can then be removed from the hearth because of the fast cooling rate which the hearth and work undergo after the manifolds have been moved away. Likewise, cold unfired tiles can also be then placed on the hearth for repetition of the described cycle of operations. It will be understood that the heat of the heat-sources continues unabated during the interval between firing batches.

Figure 4:
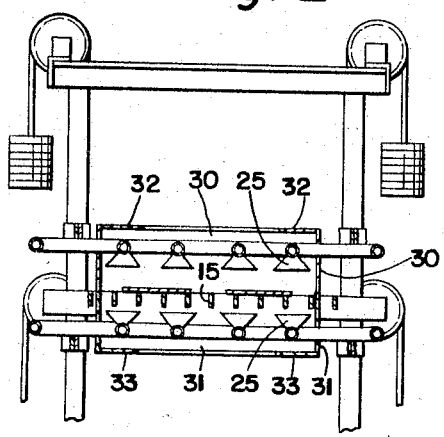
FIGURE 4 is a fragmentary vertical sectional view taken on the line 4—4 of FIG. 1 and modified so as to have box-like heat shields around the heat-sources, which shields move with the manifolds to and from their firing positions.

Referring now to FIG. 4, it is there shown that the burner heads 25, 25 on the two manifolds can be surrounded by a four-sided arrangement of vertical heat-shields 30 and 31 supported on and fastened respectively to the upper and lower manifolds so as to move therewith. Two of the lower shields (e.g., the side sections) are notched adjacent their upper edges so as to pass around the bars 15, 15 of the hearth. The end sections of the lower shields are disposed so as to penetrate between adjacent hearth bars. In this way, the manifold burner head assemblies can be made to carry heat-shields which move with the assemblies and which place no restraint on the opening and closing movements thereof. The vertical heat-shields can also include horizontal cover portions 32 and 33 which cover the firing area either completely or only partially, as desired.

The heat-shields 30 and 31 and the cover portions 32 and 33 can be made of any lightweight heat-resistant material capable of reflecting heat, such as ceramic coated metal, asbestos board, or lightweight refractory.

It will be understood that while the drawings of FIGS. 1–4 illustrate a furnace accommodating only two ceramic articles as the firing batch, the principles of the invention contemplate scaling-up of the hearth and burner areas so as to accommodate a firing batch of any desired size. In such scaling-up, or as alternatives for the structure shown in the drawings, numerous modifications can be made. Thus, the illustrated Selas burners can be replaced with other known types of air/gas burners, e.g. surface combustion units of other design, with electrical resistance units e.g. Globar (T.M.) ceramic resistors, with Fostoria (T.M.) high-intensity infrared heaters (which employ glass or quartz tubes around tungsten resistors and are described in a paper of the American Institute of Electrical Engineers, Domestic and Commercial Applications Committee, May 17–19, 1961), or other equivalent sources of essentially radiant heat. As will be understood, the important features of the adopted heat sources are that such sources provide substantially planarly-uniform heat of high caloric value wtihout flame which would impinge on the ceramic articles being fired.

Moreover, when the burner and hearth areas are scaled-up, the counterbalancing chain-and-pulley supports for the manifolds (or equivalent heat sources) can be replaced with other moving/support means such as air-or hydraulic cylinders, coordinated rotary screws having opposite threads on portions thereof disposed above and below the hearth, electric winch-type hoisting units, etc.

In a further modification, one of the sources of heat can be fixed, and the hearth and the other source of heat can be given coordinated, differential-rate movement toward and away from said fixed source of heat so that when the work has been brought to a desired firing-distance away from the fixed source of heat, the other source of heat will have also been brought to a prescribed firing-distance away from the work on its opposite side.

FIGURES 5–10 are diagrammatic illustrations of modifications which facilitate handling of the ceramic ware on a production basis whereby the furnace(s) can be used efficiently on a time basis for firing ceramic ware, thereby to approach in an intermittent (batch) operation the benefits of true continuous operation.

Referring now to FIG. 5, two receiving tables 50 and 51 are fixedly positioned adjacent the hearth 52. A hydraulic pusher cylinder 53 is also positioned fixedly adjacent receiving table 50 so that its piston and pushing blade 54 can be hydraulically actuated so as to move ceramic ware 55 from table 50 into firing position on hearth 52. When the ware has there been fired, and the burner manifolds 56 and 57 have been retracted, the pushing blade can then be actuated to push the hot ware from the hearth onto receiving table 51. It will be understood that a conveyor (not shown) can be used to bring the cold ware to a position close to receiving table 50, whereby the desired number of pieces can be placed in proper position on table 50 for being pushed onto the hearth. It will also be understood that receiving table 50 can, if desired, be the top surface of a conveyor, which on actuation can convey the fired ceramic ware away from the furnace.

Referring now to FIGS. 6–8, these views illustrate a shuttle hearth, i.e. one that can be moved back and forth between the burner manifolds 60 and 61. In such a modification, the stationary hearth of FIGS. 1–4 is replaced with the shuttle hearth, the balance of the furnace structure remaining the same. For this purpose two channel tracks 62 and 63 are fixedly secured, as by welding, to the lateral pairs of the furnace corner posts 1, 1 and 2, 2, thereby to form a pair of horizontal tracks capable of guiding and supporting a movable hearth structure. The outer ends of the channel tracks can be supported in any suitable manner, as by bars 64, 64. The ends of the channel tracks are joined together by plates 65, 65 so as to maintain their proper spacing and to confine the movable hearth within the tracks.

FIGURES 6 and 8 illustrate the structure of the movable hearth, which is made up of a pair of side bars 66, 66, a pair of end bars 67, 67 and a medial bar 68, all joined together, as by welding, to form a rectangle frame whose length is about two-thirds of the width of the structure shown in FIG. 7. Heat-resistant hearth bars are joined to the medial bar 68 and to the end bars 67. Each of the side bars 66, 66 carries three journalled rollers 70, 70 about equally spaced on the bars, two being close to the ends, and the third being in the middle. The two end rollers bear against the upper inside surface 71 of the channel tracks, while the middle roller bears on the lower inside channel track 72.

In operation of the shuttle hearth (assuming that the hearth is empty and has been drawn manually to the left of center in FIG. 7) raw ceramic ware 73, 73 is positioned on the hearth in firing position between the retracted manifolds. Then the manifolds are brought to closed (firing) position to fire said ware. Meanwhile, additional pieces of raw ware 74, 74 are positioned on the exposed portion of the hearth in positions where they will be brought to proper firing position between the closed manifolds when the shuttle hearth has been moved to the right of center in FIG. 7. After the first batch of ware 73, 73 has been fired, the hearth is then moved to said position at the right of center in FIG. 7. The hot ware 73a, 73a is now at the positions shown in FIG. 7 and it can be unloaded in any suitable manner, as by pushers or rakes (not shown) and promptly replaced with pieces of ware which is to be fired. Repetition of the cycle keeps the furnace occupied with ware.

It will be understood that the shuttle hearth can be moved from one position to the other without retracting the burner manifolds 60 and 61. However, if shielding of the type illustrated in FIG. 4 is employed with the burner manifolds, then the manifolds would need to be retracted before the hearth is moved.

Referring now to FIGS. 9 and 10, these figures illustrate a rotary or oscillatory hearth utilizing two furnaces positioned (for example only) on opposite sides of the circular hearth. The furnaces would be like the one shown in FIGS. 1–4 except for the modifications illustrated in FIGS. 9 and 10. To permit rotation of a hearth between the upper and lower burner manifolds, two of the corner tubes of the furnaces are replaced with shorter tubes which are part of a central supporting structure now to be described. Referring particularly to FIG. 10, a fixed stub cylinder 90 provides both an axle for the rotary hearth and support for the two inner corner tubes 91, 91 of the upper furnace structures. This is accomplished by fixing a bearing plate 92 (reinforced with webs 92a, 92a) to the cylinder 90, as by welding, with four stub corner tubes 93, 93 at its four corners. The upper surface of plate 92 supports a thrust bearing 94 which can be of any suitable bearing material or of any suitable structure (e.g., balls, a ball bearing, a roller bearing, etc.). On the upper surface of bearing 94 rests the hub 95 of the circular hearth (to be described in more detail hereafter). On the upper surface of the hub 95 rests a spacer ring 96.

An upper square supporting plate 97, reinforced with webs 97a, 97a is mounted on cylinder 90 so as to remain in a fixed (non-rotary) position. At its four corners are secured (as by welding) the four upper corner posts 91, 91 which extend upwardly to the superstructure of the furnaces.

As in the furnace of FIGS. 1–4, the burner manifolds are movable toward and away from the hearth, being guided in this movement by the four corner posts 1, 1, 91 and 93. Flexible hoses 98, 98 connect the manifolds through valves 99, 99 to the interior of cylinder 90. A supply of compressed fuel gas/air mixture is delivered from a suitable source (not shown) to the base 100 of cylinder 90.

Turning now to the structure of the rotary hearth, it will be seen in FIG. 9 to have an outer rim 101 made of angle iron. The rim is joined to the corners of the square hub 95 by eight spokes 102, 102. Between adjacent pairs of parallel spokes are set removable, prefabricated hearth units having heat resistant hearth bars 103, 103 joined to end bars 104 and 105. The hearth units are removable to simplify maintenance and repair, since the hearth bars are exposed for long periods of time to high heat and hence need to be replaced periodically. To keep the circular hearth level and easily rotatable, the rim is supported by a plurality of rollers 106, 106 supported on columns 107, 107.

In operation, it will be observed that unfired ceramic ware, or ware which is to be glazed can be loaded on an exposed hearth, as at 108. Rotation of the circular hearth through 90 degrees of angle brings the ware between the burner manifolds, where it is left until the desired firing operation has been completed. Meanwhile a second batch of ware which is to be fired is loaded on another exposed hearth unit, preparatory to firing. When the first batch of ware has been fired, the hearth is again rotated 90°, thereby placing the second batch in firing position and bringing the fired first batch to an exposed position from which it can be unloaded. It will be understood that the hearth can be rotated quarter turns always in the same direction, if desired, or can be rotated quarter turns forward and back, if desired. Thus it can be regarded as being a rotary hearth in one instance, or an oscillating hearth in the other instance. In either case, the exposed hearths can be both unloaded of hot, fired ware and loaded with ware to be fired during the time interval provided by the firing operation.

While FIGS. 5–10 have illustrated three different ways of operating the novel batch furnace so as to approach continuous utilization of the furnaces, other manners of accomplishing this objective will be apparent to those skilled in the art, such as through the use of an intermittently-advanced chain-link hearth, the edges of which are supported by a pair of channel guides such as support the shuttle hearth of FIGS. 6–8.

Referring now to FIG. 11, this plan view of a standard wall tile 110 is included to show that such tile have small projections on their edges which are formed there to provide a uniform spacing between tiles when being set in a wall. These projections are also helpful when the tile are being glazed since they keep the surface coatings of unfired glaze on different pieces from coming into contact with each other. Because of this, tile which are to be glazed in the furnaces of FIGS. 1–10 can be pushed or pulled onto the hearth without damaging the unfired glaze or without damaging the soft, tacky glaze existing immediately after completion of the firing operation.

*Typical fast-fire ceramic formulations*

For purposes of illustration only, the wall tile shown in FIGS. 1—11 can have been prepared from materials conforming to the following formulas:

| | Body Formulas | | |
|---|---|---|---|
| | Talc Body | Wollastonite Body | Fritted Body |
| Talc (New York), percent | 70.0 | | 58.0 |
| Wollastonite, percent | | 55.0 | 5.0 |
| Ball Clay, percent | 30.0 | 30.0 | 30.0 |
| Flint, percent | | 15.0 | |
| Frit G, percent | | | 7.0 |
| Spray with glaze | A | A | B or C |
| Maturing Cycle | Two Fire | One Fire | Two Fire |
| Maturing Temperature, °F | 1,900–2,000 | 1,900–2,000 | 1,600–1,700 |

| | Glaze Formulas | | |
|---|---|---|---|
| | A | B | C |
| | Percent | Percent | Percent |
| Frit D | 19.5 | | |
| Frit E | | 88.0 | |
| Frit F | | | 78.0 |
| Feldspar | 28.4 | | |
| Flint | 8.7 | | |
| Clay | 8.9 | 3.0 | |
| Zinc oxide | 9.6 | | 10.2 |
| Wollastonite | 14.3 | | |
| Barium carbonate | 1.0 | | |
| Opacifier | 9.6 | 9.0 | [1] 11.8 |

[1] e.g., Zirconium silicate.

| | Frit Formulas | | | |
|---|---|---|---|---|
| | Frit D | Frit E | Frit F | Frit G |
| | Percent | Percent | Percent | Percent |
| $K_2O$ | 0.3 | | 2.0 | 1.7 |
| $Na_2O$ | 8.5 | 3.6 | 1.9 | 14.7 |
| $CaO$ | 17.0 | 4.5 | 5.7 | 0.1 |
| $PbO$ | | 31.0 | 28.7 | |
| $Al_2O_3$ | 5.0 | 3.4 | 3.8 | 3.6 |
| $B_2O_3$ | 18.7 | 13.0 | 13.2 | 28.9 |
| $SiO_2$ | 50.0 | 43.5 | 41.2 | 51.0 |
| $ZrO_2$ | | 1.0 | 1.2 | |
| $F$ | | | 2.3 | |

The body compositions are prepared by mixing together the various inorganic ingredients called for by the body formulas, intimately blending the ingredients, as in a double-cone blender, and then incorporating sufficient water (e.g. about 6–7% by weight) to enable a body to hold together when pressed in a tile press. The mass is then screened through an 8 mesh sieve for pressing. The resulting pressed tiles can then be fast-fired in accordance with the present invention, or if desired, the unfired tile can be sprayed with raw glaze, dried suitably, and then fast-fired in accordance with the present invention (i.e. a one-fire treatment). It will be understood, of course, that after an unglazed tile has been fast-fired, it can then be sprayed with glaze, dried and fast-fired again (i.e., a two-fire treatment). The preliminary drying in one-fire and two-fire treatments can be accomplished in various ways, such as a five-minute heating prior to fast-firing to make sure all the moisture is driven out of the body.

The glaze compositions for one-fire and two-fire treatments are prepared by milling the ingredients called for by the glaze formulas supra with about 0.4% bentonite in water, to a fineness of less than about 1% on 325 mesh, and then adjusting to a specific gravity of about 1.50 to 2.00, preferably about 1.86, by adding water immediately before spraying. A typical sprayed glaze coating on a 4¼" x 4¼" tile weighs about 18 grams.

From the foregoing description of the invention, it will be understood that the furnaces are particularly useful for fast-firing a wide variety of ceramic and related ware such as wall and floor tile, architectural tile, dinner ware, novelty ware, porcelain enameled ware (e.g. architectural panels, kitchen ware, cutlery, etc.). Such and similar articles can also be glazed, i.e., by a one-fire or two-fire treatment. Moreover, because of the fast heat-up and fast cooling time, many other kinds of materials can be heated and/or heat-treated in the furnaces, e.g., quenched frit can be heat-treated to develop known qualities while retaining the frit in particulate, unsintered form; metal sheet, rods, wires, drills and powders can be given various heat-treatments such as accelerated aging treatments, tempering treatments, etc. Sheet glass can be formed by bending. Thus it will be understood that the furnaces can be used in any situation where its fast-heat-up and fast-cooling features provide an advantage. In general the articles so fired need only be of such configuration when in firing position on the hearth that they are heated substantially uniformly from opposite sides across their thin dimensions.

Other modifications which will be readily understood from the foregoing description are as follows:

Where gas burners are used it is preferred, as mentioned above, to secure substantially-flameless heating. It is believed to be evident however, that substantially flat ceramic muffle plates can be mounted between each set of burners and the hearth so as (a) to prevent flame-impingement on the ware, and (b) to secure uniform heating in the planes of the muffle plates. Such muffle plates help to assure uniformity of temperature on the faces of the ware adjacent said plates. It should be recognized, however, that for example, the top surface of the ware, although uniformly heated, need not be at the same uniform temperature as the bottom surface of the ware. It is advantageous, for example, in glazing by a one-fire treatment, to heat the bottom of the ware hotter than the top up to the time the glaze becomes fluid. This extra heating on the bottom helps to drive volatile material(s) out of the body and hence keeps such material(s) from being trapped by the fluid glaze.

It will, of course, be understood that the movable planar sources of heat can be varied in intensity of heat in various ways, if desired. That is, gas burners can be throttled and electrical resistance units can be adjusted in temperature by controlling the amount of current flowing through them.

While the drawings show furnace structures which have no outer protective structure to obstruct external currents of air and/or hot gas, it will be apparent that where such currents tend to give non-uniformity of heating, then protective members can be arranged around the hearth and/or sources of heat. Usually it is sufficient to merely install polished metal plates serving both as reflectors and as solid barriers to otherwise uncontrolled drafts.

Where a tendency for some ware to warp out of flatness when being fast-fired occurs, this tendency can be counteracted in good measure by adjusting the sources of heat so that the top or bottom surface is heated more intensely than the other. Since very slight convex warpage of e.g. the upper face of a tile, is ordinarily less objectionable than concave warpage, it is usually helpful to heat the bottom surface slightly hotter than the top.

While the drawings illustrate the use of tubular manifolds supplying air and fuel to a plurality of gas burners with open spaces between the burner heads, it will be apparent that equivalent planar sources of heat can be made with the burner heads set into a substantially solid mass of ceramic or refractory material having a flat burner surface.

Where a fixed hearth is used, then of course it is most advantageous to move the ware thereacross in its narrowest dimension, when loading and unloading the hearth.

The furnaces of the invention are especially useful in the fast-firing of e.g. tile because the ware can be heated rapidly to a predetermined firing temperature. As soon as said temperature has been attained (a) the source of heat can be quickly moved away so as to fire the ware according to a flat time-temperature curve, or (b) the sources of heat can be adjusted periodically as to distance away from the ware so that the ware is fired according to any desired non-flat time-temperature curve.

Having described my invention, what I claim is:

1. A fast-firing ceramic furnace comprising a generally planar hearth having fast heating and fast cooling times for supporting ceramic articles, first heat source means disposed above said hearth and providing substantially planarly-uniform firing heat, second heat source means disposed beneath said hearth and providing substantially planarly-uniform firing heat, and means (a) for relatively moving said first and second heat source means quickly toward each other while providing substantially planarly-uniform firing heat to bring said first and second heat source means to predetermined parallel firing locations above and beneath said hearth to simultaneously heat the articles on said hearth substantially equally and uniformly from the opposite sides thereof, and (b) for relatively moving said first and second heat source means quickly away from one another to predetermined locations spaced from said hearth to allow the fired articles to cool off quickly, said first and second heat source means and the area between them comprising a firing zone, said firing zone being unshrouded by any substantial heat retention mass.

2. A furnace as claimed in claim 1 wherein said first and second heat sources each comprise a horizontal and planar manifold for conveying a combustible air/fuel gas mixture, and a plurality of substantially flameless burner heads of uniform height attached to and supplied with said combustible mixture by said manifold.

3. A furnace as claimed in claim 1 wherein said hearth is movable in a fixed horizontal plane.

4. A furnace as claimed in claim 3 wherein said hearth is a shuttle hearth constrained for back-and-forth rectilinear movement in said horizontal plane.

5. A furnace as claimed in claim 3 wherein said hearth is carried in a circular frame constrained for rotation in said horizontal plane about a fixed vertical axis spaced from said first and second heat source means.

6. A furnace as claimed in claim 1 which includes external mechanical means for moving ceramic ware onto and off of said hearth in a predetermined sequence of operations.

7. A furnace as claimed in claim 6 which includes at least one conveyor for transporting ceramic ware fired in said furnace.

8. A furnace, as defined in claim 1, and wherein said first and second heat source means are both supported for linear vertical movement toward and from said hearth.

9. A fast-firing ceramic furnace comprising a horizontally disposed, generally planar hearth having fast heating and fast cooling times for supporting ceramic articles, first heat source means disposed directly above said hearth and supported for linear vertical movement toward and from said hearth, second heat source means disposed directly beneath said hearth and supported for linear vertical movement toward nad from said hearth, said first and second heat source means being generally horizontally disposed and providing substantially planarly-uniform firing heat over a substantial area of said hearth, and means (a) for quickly moving said first and second heat source means toward each other and said hearth while providing substantially planarly-uniform firing heat to predetermined firing locations above and beneath said hearth to simultaneously heat the articles on said hearth substantially equally and uniformly from the opposite sides thereof, and (b) for quickly moving said first and second heat source means away from one another and said hearth to predetermined locations spaced from said hearth to allow the fired articles to cool off quickly while said first and second heat source means continue to operate unabated.

10. The batch process of fast-firing ceramic articles which comprises the steps of positioning the articles to be fired on a horizontal generally planar hearth having fast heat-up and fast-cooling times, quickly exposing said hearth and articles to firing heat provided by two separate sources of planarly-uniform heat disposed above and below said hearth and generally parallel to the plane of said hearth by relatively moving said sources of heat toward each other while providing said planarly uniform heat to suitable firing distances away from said articles to heat said articles equally and uniformly from opposite sides for a predetermined firing period, and then quickly relatively moving said fired articles and said sources of heat to cooling-off distances away from each other while said sources of heat continue to operate unabated.

11. The batch process, as defined in claim 10, and wherein said heat sources and area therebetween define a firing zone, and which is carried out with the firing zone being unshrouded by any substantial heat retention mass.

12. The batch process of fast-firing ceramic articles which comprises the steps of positioning the articles to be fired on a stationary, horizontal and planar hearth having fast heat-up and fast cooling times, quickly moving two separate sources of planarly-uniform heat movably disposed above and below said hearth for vertical movement toward each other and toward said hearth to suitable firing distances spaced from said articles to heat said articles substantially equally and uniformly from opposite sides for a predetermined firing period, and then quickly moving said two sources of heat away from each other and from said articles to suitable distances such that said hearth and articles cool off quickly while said sources of heat continue to operate unabated.

13. A process for fast-firing batches of articles disposed in a firing position by heating with radiant heat from heating sources operating at a given energy level during the firing, and which comprises the steps of positioning in the firing position a batch of articles on a hearth capable of being rapidly heated and rapidly cooled, quickly exposing said batch of articles to radiant heat from said heating sources by rleatively positioning said radiant heat sources at said firing position on opposite sides of said hearth and with said heating sources extending generally parallel to said hearth for a predetermined time to heat said articles from the opposite sides to expose said articles to full firing heat immediately at the start of the firing operation, cooling the articles by quickly moving said radiant heat sources in directions away from each other and from said articles to locations such that the articles are quickly exposed to cooling air from the ambient atmosphere, removing the fired batch of articles from the firing position and positioning a new batch of articles in the firing position, and repeating the process.

References Cited

UNITED STATES PATENTS

| 1,708,124 | 4/1929 | Dedouch. |
| 2,409,431 | 10/1946 | Hess _____ 263—3 |
| 2,785,884 | 3/1957 | Stout _____ 263—8 |
| 2,898,101 | 8/1959 | Hannum et al. _____ 263—6 X |
| 3,095,186 | 6/1963 | Sondy _____ 263—7 |

FOREIGN PATENTS

| 739,304 | 10/1955 | Great Britain. |

FREDERICK L. MATTESON, JR., *Primary Examiner.*

D. A. TAMBURRO, *Assistant Examiner.*

UNITED STATES PATENT OFFICE
CERTIFICATE OF CORRECTION

Patent No. 3,322,413                          May 30, 1967

William Henry Orth

It is hereby certified that error appears in the above numbered patent requiring correction and that the said Letters Patent should read as corrected below.

Column 2, line 22, for "relates" read -- related --; line 43, for "showning" read -- showing --; column 4, line 43, for "wtihout" read -- without --; column 9, line 62, for "nad" read -- and --; column 10, line 45, for "rleatively" read -- relatively --.

Signed and sealed this 2nd day of January 1968.

(SEAL)
Attest:

Edward M. Fletcher, Jr.

Attesting Officer

EDWARD J. BRENNER

Commissioner of Patents